(12) United States Patent
Lee et al.

(10) Patent No.: US 7,168,027 B2
(45) Date of Patent: Jan. 23, 2007

(54) DYNAMIC SYNCHRONIZATION OF DATA CAPTURE ON AN OPTICAL OR OTHER HIGH SPEED COMMUNICATIONS LINK

(75) Inventors: Terry R. Lee, Boise, ID (US); Joseph M. Jeddeloh, Shoreview, MN (US)

(73) Assignee: Micron Technology, Inc., Boise, ID (US)

(*) Notice: Subject to any disclaimer, the term of this patent is extended or adjusted under 35 U.S.C. 154(b) by 415 days.

(21) Appl. No.: 10/461,207

(22) Filed: Jun. 12, 2003

(65) Prior Publication Data

US 2005/0005181 A1 Jan. 6, 2005

(51) Int. Cl.
*H03M 13/00* (2006.01)

(52) U.S. Cl. ............ 714/775; 714/25; 714/42

(58) Field of Classification Search ........ 714/775, 714/2, 5, 25, 42, 48; 340/2.27; 398/6, 5; 711/105, 167
See application file for complete search history.

(56) References Cited

U.S. PATENT DOCUMENTS

| | | | |
|---|---|---|---|
| 3,633,174 A | 1/1972 | Griffin | 340/172.5 |
| 4,004,100 A | 1/1977 | Takimoto | 179/15 BS |
| 4,077,016 A | 2/1978 | Sanders et al. | 331/4 |
| 4,096,402 A | 6/1978 | Schroeder et al. | 307/362 |
| 4,404,474 A | 9/1983 | Dingwall | 307/260 |
| 4,481,625 A | 11/1984 | Roberts et al. | 370/85 |
| 4,508,983 A | 4/1985 | Allgood et al. | 307/577 |
| 4,511,846 A | 4/1985 | Nagy et al. | 328/164 |
| 4,514,647 A | 4/1985 | Shoji | 307/269 |
| 4,524,448 A | 6/1985 | Hullwegen | 375/118 |
| 4,573,017 A | 2/1986 | Levine | 327/114 |
| 4,600,895 A | 7/1986 | Landsman | 331/1 A |
| 4,603,320 A | 7/1986 | Farago | 341/89 |
| 4,638,187 A | 1/1987 | Boler et al. | 307/451 |
| 4,638,451 A | 1/1987 | Hester et al. | 395/889 |
| 4,687,951 A | 8/1987 | McElroy | 307/269 |
| 4,697,167 A | 9/1987 | O'Keeffe et al. | 340/347 DD |
| 4,727,541 A | 2/1988 | Mori et al. | 370/112 |

(Continued)

FOREIGN PATENT DOCUMENTS

EP 0 171 720 A2 2/1986

(Continued)

OTHER PUBLICATIONS

Micro Linear Application Note 6, "Fiber Optics," Aug. 1998, pp. 1-12.

(Continued)

*Primary Examiner*—Guy Lamarre
*Assistant Examiner*—Fritz Alphonse
(74) *Attorney, Agent, or Firm*—Dorsey & Whitney LLP (57) ABSTRACT

A method and system that dynamically adjusts link control parameters of a communications network. The communications network includes a transmitter coupled through a first data link to a receiver. The transmitter and receiver each have at least one associated link control parameter that affects the operation of that component. According to one method, data signals are transmitted over the first data link and the transmitted data signals are captured. The values of the captured data signals are compared to expected values for those signals, and the values of the link control parameters are adjusted to successfully capture the transmitted digital signals.

41 Claims, 4 Drawing Sheets

U.S. PATENT DOCUMENTS

| | | |
|---|---|---|
| 4,740,962 A | 4/1988 | Kish, III ............... 370/102 |
| 4,746,996 A | 5/1988 | Furuhata et al. ........ 360/36.2 |
| 4,773,085 A | 9/1988 | Cordell .................. 375/120 |
| 4,789,796 A | 12/1988 | Foss ..................... 307/443 |
| 4,791,622 A | 12/1988 | Clay et al. ............. 369/59 |
| 4,818,995 A | 4/1989 | Takahashi et al. ....... 341/94 |
| 4,893,087 A | 1/1990 | Davis .................... 328/14 |
| 4,902,986 A | 2/1990 | Lesmeister ............. 331/25 |
| 4,924,516 A | 5/1990 | Bremer et al. .......... 380/46 |
| 4,953,128 A | 8/1990 | Kawai et al. ........... 365/194 |
| 4,958,088 A | 9/1990 | Farah-Bakhsh et al. ... 307/443 |
| 4,972,470 A | 11/1990 | Farago ................... 380/3 |
| 4,979,185 A | 12/1990 | Bryans et al. ......... 375/20 |
| 4,984,204 A | 1/1991 | Sato et al. |
| 4,984,255 A | 1/1991 | Davis et al. |
| 5,020,023 A | 5/1991 | Smith |
| 5,038,115 A | 8/1991 | Myers et al. |
| 5,062,082 A | 10/1991 | Choi |
| 5,075,569 A | 12/1991 | Branson |
| 5,086,500 A | 2/1992 | Greub |
| 5,087,828 A | 2/1992 | Sato et al. |
| 5,113,519 A * | 5/1992 | Johnson et al. ......... 707/201 |
| 5,120,990 A | 6/1992 | Koker |
| 5,122,690 A | 6/1992 | Bianchi |
| 5,128,560 A | 7/1992 | Chern et al. |
| 5,128,563 A | 7/1992 | Hush et al. |
| 5,130,565 A | 7/1992 | Girmay |
| 5,134,311 A | 7/1992 | Biber et al. |
| 5,150,186 A | 9/1992 | Pinney et al. |
| 5,165,046 A | 11/1992 | Hesson |
| 5,168,199 A | 12/1992 | Huffman et al. |
| 5,179,298 A | 1/1993 | Hirano et al. |
| 5,182,524 A | 1/1993 | Hopkins |
| 5,194,765 A | 3/1993 | Dunlop et al. |
| 5,212,601 A | 5/1993 | Wilson |
| 5,220,208 A | 6/1993 | Schenck |
| 5,223,755 A | 6/1993 | Richley |
| 5,229,929 A | 7/1993 | Shimizu et al. |
| 5,233,314 A | 8/1993 | McDermott et al. |
| 5,233,564 A | 8/1993 | Ohshima et al. |
| 5,239,206 A | 8/1993 | Yanai |
| 5,243,703 A | 9/1993 | Farmwald et al. |
| 5,254,883 A | 10/1993 | Horowitz et al. |
| 5,256,989 A | 10/1993 | Parker et al. |
| 5,257,294 A | 10/1993 | Pinto et al. |
| 5,268,639 A | 12/1993 | Gasbarro et al. |
| 5,272,729 A | 12/1993 | Bechade et al. |
| 5,274,276 A | 12/1993 | Casper et al. |
| 5,276,642 A | 1/1994 | Lee |
| 5,278,460 A | 1/1994 | Casper |
| 5,281,865 A | 1/1994 | Yamashita et al. |
| 5,283,631 A | 2/1994 | Koerner et al. |
| 5,289,580 A | 2/1994 | Latif et al. |
| 5,295,164 A | 3/1994 | Yamamura |
| 5,304,952 A | 4/1994 | Quiet et al. |
| 5,311,481 A | 5/1994 | Casper et al. |
| 5,311,483 A | 5/1994 | Takasugi |
| 5,313,431 A | 5/1994 | Uruma et al. |
| 5,315,269 A | 5/1994 | Fujii |
| 5,315,388 A | 5/1994 | Shen et al. |
| 5,321,368 A | 6/1994 | Hoelzle |
| 5,337,285 A | 8/1994 | Ware et al. |
| 5,341,405 A | 8/1994 | Mallard, Jr. |
| 5,347,177 A | 9/1994 | Lipp |
| 5,347,179 A | 9/1994 | Casper et al. |
| 5,355,391 A | 10/1994 | Horowitz et al. |
| 5,361,002 A | 11/1994 | Casper |
| 5,367,649 A | 11/1994 | Cedar |
| 5,379,299 A | 1/1995 | Schwartz |
| 5,390,308 A | 2/1995 | Ware et al. |
| 5,400,283 A | 3/1995 | Raad |
| 5,402,389 A | 3/1995 | Flannagan et al. |
| 5,408,640 A | 4/1995 | MacIntyre et al. |
| 5,410,263 A | 4/1995 | Waizman |
| 5,416,436 A | 5/1995 | Rainard |
| 5,416,909 A | 5/1995 | Long et al. |
| 5,420,544 A | 5/1995 | Ishibashi |
| 5,424,687 A | 6/1995 | Fukuda |
| 5,428,311 A | 6/1995 | McClure |
| 5,428,317 A | 6/1995 | Sanchez et al. |
| 5,430,408 A | 7/1995 | Ovens et al. |
| 5,430,676 A | 7/1995 | Ware et al. |
| 5,432,823 A | 7/1995 | Gasbarro et al. |
| 5,438,545 A | 8/1995 | Sim |
| 5,440,260 A | 8/1995 | Hayashi et al. |
| 5,440,514 A | 8/1995 | Flannagan et al. |
| 5,444,667 A | 8/1995 | Obara |
| 5,446,696 A | 8/1995 | Ware et al. |
| 5,448,193 A | 9/1995 | Baumert et al. |
| 5,451,898 A | 9/1995 | Johnson |
| 5,457,407 A | 10/1995 | Shu et al. |
| 5,463,337 A | 10/1995 | Leonowich |
| 5,465,076 A | 11/1995 | Yamauchi et al. |
| 5,473,274 A | 12/1995 | Reilly et al. |
| 5,473,575 A | 12/1995 | Farmwald et al. |
| 5,473,639 A | 12/1995 | Lee et al. |
| 5,485,490 A | 1/1996 | Leung et al. |
| 5,488,321 A | 1/1996 | Johnson |
| 5,489,864 A | 2/1996 | Ashuri |
| 5,497,127 A | 3/1996 | Sauer |
| 5,497,355 A | 3/1996 | Mills et al. |
| 5,498,990 A | 3/1996 | Leung et al. |
| 5,500,808 A | 3/1996 | Wang |
| 5,502,672 A | 3/1996 | Kwon |
| 5,506,814 A | 4/1996 | Hush et al. |
| 5,508,638 A | 4/1996 | Cowles et al. |
| 5,513,327 A | 4/1996 | Farmwald et al. |
| 5,515,403 A | 5/1996 | Sloan et al. |
| 5,532,714 A | 7/1996 | Knapp et al. |
| 5,539,345 A | 7/1996 | Hawkins |
| 5,544,124 A | 8/1996 | Zagar et al. |
| 5,544,203 A | 8/1996 | Casasanta et al. |
| 5,550,515 A | 8/1996 | Liang et al. |
| 5,550,783 A | 8/1996 | Stephens, Jr. et al. |
| 5,552,727 A | 9/1996 | Nakao |
| 5,555,429 A | 9/1996 | Parkinson et al. |
| 5,557,224 A | 9/1996 | Wright et al. |
| 5,557,781 A | 9/1996 | Stones et al. |
| 5,563,546 A | 10/1996 | Tsukada |
| 5,568,075 A | 10/1996 | Curran et al. |
| 5,568,077 A | 10/1996 | Sato et al. |
| 5,572,557 A | 11/1996 | Aoki |
| 5,572,722 A | 11/1996 | Vogley |
| 5,574,698 A | 11/1996 | Raad |
| 5,576,645 A | 11/1996 | Farwell |
| 5,577,079 A | 11/1996 | Zenno et al. |
| 5,577,236 A | 11/1996 | Johnson et al. |
| 5,578,940 A | 11/1996 | Dillon et al. |
| 5,578,941 A | 11/1996 | Sher et al. |
| 5,579,326 A | 11/1996 | McClure |
| 5,581,197 A | 12/1996 | Motley et al. |
| 5,589,788 A | 12/1996 | Goto |
| 5,590,073 A | 12/1996 | Arakawa et al. |
| 5,594,690 A | 1/1997 | Rothenberger et al. |
| 5,614,855 A | 3/1997 | Lee et al. |
| 5,619,473 A | 4/1997 | Hotta |
| 5,621,340 A | 4/1997 | Lee et al. |
| 5,621,690 A | 4/1997 | Jungroth et al. |
| 5,621,739 A | 4/1997 | Sine et al. |
| 5,627,780 A | 5/1997 | Malhi |
| 5,627,791 A | 5/1997 | Wright et al. |
| 5,631,872 A | 5/1997 | Naritake et al. |
| 5,636,163 A | 6/1997 | Furutani et al. |
| 5,636,173 A | 6/1997 | Schaefer |

| | | |
|---|---|---|
| 5,636,174 A | 6/1997 | Rao |
| 5,638,335 A | 6/1997 | Akiyama et al. |
| 5,646,904 A | 7/1997 | Ohno et al. |
| 5,652,530 A | 7/1997 | Ashuri |
| 5,657,289 A | 8/1997 | Hush et al. |
| 5,657,481 A | 8/1997 | Farmwald et al. |
| 5,663,921 A | 9/1997 | Pascucci et al. |
| 5,666,313 A | 9/1997 | Ichiguchi |
| 5,666,322 A | 9/1997 | Conkle |
| 5,668,763 A | 9/1997 | Fujioka et al. |
| 5,668,774 A | 9/1997 | Furutani |
| 5,673,005 A | 9/1997 | Pricer |
| 5,675,274 A | 10/1997 | Kobayashi et al. |
| 5,675,588 A | 10/1997 | Maruyama et al. |
| 5,692,165 A | 11/1997 | Jeddeloh et al. |
| 5,694,065 A | 12/1997 | Hamasaki et al. |
| 5,708,611 A | 1/1998 | Iwamoto et al. |
| 5,712,580 A | 1/1998 | Baumgartner et al. |
| 5,712,883 A | 1/1998 | Miller et al. |
| 5,719,508 A | 2/1998 | Daly |
| 5,737,342 A | 4/1998 | Ziperovich |
| 5,740,123 A | 4/1998 | Uchida |
| 5,751,665 A | 5/1998 | Tanoi |
| 5,764,092 A | 6/1998 | Wada et al. |
| 5,767,715 A | 6/1998 | Marquis et al. |
| 5,768,177 A | 6/1998 | Sakuragi |
| 5,774,699 A | 6/1998 | Nagae |
| 5,778,214 A | 7/1998 | Taya et al. |
| 5,781,499 A | 7/1998 | Koshikawa |
| 5,784,422 A | 7/1998 | Heermann |
| 5,789,947 A | 8/1998 | Sato |
| 5,790,612 A | 8/1998 | Chengson et al. |
| 5,794,020 A | 8/1998 | Tanaka et al. |
| 5,805,931 A | 9/1998 | Morzano et al. |
| 5,812,619 A | 9/1998 | Runaldue |
| 5,822,314 A | 10/1998 | Chater-Lea |
| 5,831,545 A * | 11/1998 | Murray et al. .............. 340/7.27 |
| 5,831,929 A | 11/1998 | Manning |
| 5,841,707 A | 11/1998 | Cline et al. |
| 5,852,378 A | 12/1998 | Keeth |
| 5,872,959 A | 2/1999 | Nguyen et al. |
| 5,889,829 A | 3/1999 | Chiao et al. |
| 5,898,242 A | 4/1999 | Peterson |
| 5,898,674 A | 4/1999 | Mawhinney et al. |
| 5,917,760 A | 6/1999 | Millar |
| 5,920,518 A | 7/1999 | Harrison et al. |
| 5,926,047 A | 7/1999 | Harrison |
| 5,926,436 A | 7/1999 | Toda et al. |
| 5,940,608 A | 8/1999 | Manning |
| 5,940,609 A | 8/1999 | Harrison |
| 5,945,855 A | 8/1999 | Momtaz |
| 5,946,244 A | 8/1999 | Manning |
| 5,953,284 A | 9/1999 | Baker et al. |
| 5,953,386 A | 9/1999 | Anderson |
| 5,964,884 A | 10/1999 | Partovi et al. |
| 5,990,719 A | 11/1999 | Dai et al. |
| 6,005,694 A * | 12/1999 | Liu ................................. 398/6 |
| 6,005,823 A | 12/1999 | Martin et al. |
| 6,011,732 A | 1/2000 | Harrison et al. |
| 6,014,042 A | 1/2000 | Nguyen |
| 6,016,282 A | 1/2000 | Keeth |
| 6,021,268 A * | 2/2000 | Johnson .......................... 703/3 |
| 6,023,489 A | 2/2000 | Hatch |
| 6,026,050 A | 2/2000 | Baker et al. |
| 6,026,134 A | 2/2000 | Duffy et al. |
| 6,029,250 A | 2/2000 | Keeth |
| 6,038,219 A | 3/2000 | Mawhinney et al. |
| 6,067,592 A | 5/2000 | Farmwald et al. |
| 6,072,802 A | 6/2000 | Uhm et al. ................. 370/441 |
| 6,087,857 A | 7/2000 | Wang |
| 6,101,152 A | 8/2000 | Farmwald et al. |
| 6,101,197 A | 8/2000 | Keeth et al. |
| 6,105,157 A | 8/2000 | Miller |

| | | |
|---|---|---|
| 6,115,318 A | 9/2000 | Keeth |
| 6,119,242 A | 9/2000 | Harrison |
| 6,125,157 A | 9/2000 | Donnelly et al. |
| 6,147,905 A | 11/2000 | Seino |
| 6,147,916 A | 11/2000 | Ogura |
| 6,160,423 A | 12/2000 | Haq |
| 6,173,432 B1 | 1/2001 | Harrison |
| 6,194,917 B1 | 2/2001 | Deng |
| 6,253,360 B1 | 6/2001 | Yoshiba |
| 6,262,921 B1 | 7/2001 | Manning |
| 6,269,451 B1 | 7/2001 | Mullarkey |
| 6,285,726 B1 | 9/2001 | Gaudet |
| 6,295,328 B1 | 9/2001 | Kim et al. |
| 6,298,450 B1 | 10/2001 | Liu et al. |
| 6,327,196 B1 | 12/2001 | Mullarkey |
| 6,327,318 B1 | 12/2001 | Bhullar et al. |
| 6,338,127 B1 * | 1/2002 | Manning .................... 711/167 |
| 6,377,646 B1 | 4/2002 | Sha |
| 6,378,079 B1 | 4/2002 | Mullarkey |
| 6,430,696 B1 | 8/2002 | Keeth |
| 6,438,043 B2 | 8/2002 | Gans et al. |
| 6,442,644 B1 * | 8/2002 | Gustavson et al. ......... 711/105 |
| 6,473,871 B1 * | 10/2002 | Coyle et al. ................ 714/715 |
| 6,484,244 B1 | 11/2002 | Manning |
| 6,493,320 B1 * | 12/2002 | Schober et al. ............. 370/241 |
| 6,499,111 B2 | 12/2002 | Mullarkey |
| 6,502,212 B1 * | 12/2002 | Coyle et al. .................. 714/43 |
| 6,526,111 B1 | 2/2003 | Prasad ........................ 375/376 |
| 6,580,531 B1 * | 6/2003 | Swanson et al. ............... 398/5 |
| 6,665,222 B2 | 12/2003 | Wright et al. |
| 6,694,496 B2 * | 2/2004 | Goslin et al. ................... 716/4 |
| 6,816,987 B1 * | 11/2004 | Olson et al. ................ 714/704 |
| 6,910,146 B2 | 6/2005 | Dow ........................... 713/500 |
| 6,950,956 B2 | 9/2005 | Zerbe et al. ................ 713/400 |
| 6,980,824 B2 * | 12/2005 | Hsu et al. ................... 455/522 |

FOREIGN PATENT DOCUMENTS

| | | |
|---|---|---|
| EP | 0 295 515 A1 | 12/1988 |
| EP | 0 406 786 A1 | 1/1991 |
| EP | 0 450 871 A2 | 10/1991 |
| EP | 0 476 585 A3 | 3/1992 |
| EP | 0 655 741 A2 | 5/1995 |
| EP | 0 655 834 A1 | 5/1995 |
| EP | 0 680 049 A2 | 11/1995 |
| EP | 0 703 663 A1 | 3/1996 |
| EP | 0 704 848 A3 | 4/1996 |
| EP | 0 704 975 A1 | 4/1996 |
| EP | 0 767 538 A1 | 4/1997 |
| JP | 6-1237512 | 10/1986 |
| JP | 2-112317 | 4/1990 |
| JP | 4-135311 | 5/1992 |
| JP | 5-136664 | 6/1993 |
| JP | 5-282868 | 10/1993 |
| JP | 0-7319577 | 12/1995 |
| WO | WO 94/29871 | 12/1994 |
| WO | WO 95/22200 | 8/1995 |
| WO | WO 95/22206 | 8/1995 |
| WO | WO 96/10866 | 4/1996 |
| WO | WO 97/14289 | 4/1997 |
| WO | WO 97/42557 | 11/1997 |

OTHER PUBLICATIONS

Park, D. et al., "Fast Acquisition Frequency Synthesizer with the Multiple Phase Detectors", IEEE Pacific Rim Conference on Communications, Computers and Signal Processing, vol. 2, May 1991. pp. 665-668.

Alvarez, J. et al. "A Wide-Bandwidth Low Voltage PLL for PowerPC™ Microprocessors" IEEE IEICE Trans. Electron., vol. E-78. No. 6, Jun. 1995, pp. 631-639.

Anonymous, "400MHz SLDRAM, 4M X 16 SLDRAM Pipelined, Eight Bank, 2.5 V Operation," SLDRAM Consortium Advance Sheet, published throughout the United States, pp. 1-22.

Anonymous, "Draft Standard for a High-Speed Memory Interface (SyncLink)", Microprocessor and Microcomputer Standards Subcommittee of the IEEE Computer Society, Copyright 1996 by the Institute of Electrical and Electronics Engineers, Inc., New York, NY, pp. 1-56.

Anonymous, "Programmable Pulse Generator", IBM Technical Disclosure Bulletin, vol. 17, No. 12, May 1975, pp. 3553-3554.

Arai, Y. et al., "A Time Digitizer CMOS Gate-Array with a 250 ps Time Resolution", XP 000597207, IEEE Journal of Solid-State Circuits, vol. 31, No. 2, Feb. 1996, pp. 212-220.

Anonymous, "Pulse Combining Network", IBM Technical Disclosure Bulletin, vol. 32, No.12, May 1990, pp. 149-151.

Anonymous, "Variable Delay Digital Circuit", IBM Technical Disclosure Bulletin, vol. 35, No. 4A, Sep. 1992, pp. 365-366.

Arai, Y. et al., "A CMOS Four Channel x 1K Time Memory LSI with 1-ns/b Resolution", IEEE Journal of Solid-State Circuits, vol. 27, No. 3, M, 8107 Mar. 1992, No. 3, New York, US, pp. 359-364 and pp. 528-531.

Aviram, A. et al., "Obtaining High Speed Printing on Thermal Sensitive Special Paper with a Resistive Ribbon Print Head", IBM Technical Disclosure Bulletin, vol. 27, No. 5, Oct. 1984, pp. 3059-3060.

Bazes, M., "Two Novel Fully Complementary Self-Biased CMOS Differential Amplifiers", IEEE Journal of Solid-State Circuits, vol. 26, No. 2, Feb. 1991, pp. 165-168.

Chapman, J. et al., "A Low-Cost High-Performance CMOS Timing Vernier for ATE", IEEE International Test Conference, Paper 21.2, 1995, pp. 459-468.

Cho, J. "Digitally-Controlled PLL with Pulse Width Detection Mechanism for Error Correction", ISSCC 1997, Paper No. SA 20.3, pp. 334-335.

Christiansen, J., "An Integrated High Resolution CMOS Timing Generator Based on an Array of Delay Locked Loops", IEEE Journal of Solid-State Circuits, vol. 31, No. 7, Jul. 1996, pp. 952-957.

Combes, M. et al., "A Portable Clock Multiplier Generator Using Digital CMOS Standard Cells", IEEE Journal of Solid-State Circuits, vol. 31, No. 7, Jul. 1996, pp. 958-965.

Donnelly, K. et al., "A 660 MB/s Interface Megacell Portable Circuit in 0.3 μm-0.7 μm CMOS ASIC", IEEE Journal of Solid-State Circuits, vol. 31, No. 12, Dec. 1996, pp. 1995-2001.

Goto, J. et al., "A PLL-Based Programmable Clock Generator with 50- to 350-MHz Oscillating Range for Video Signal Processors", IEICE Trans. Electron., vol. E77-C, No. 12, Dec. 1994, pp. 1951-1956.

Gustavsion, David B., et al., "IEEE Standard for Scalable Coherent Interface (SCI)," IEEE Computer Society, IEEE Std. 1596-1992, Aug. 2, 1993.

Hamamoto, T., "400-MHz Random Column Operating SDRAM Techniques with Self-Skew Compensation", IEEE Journal of Solid-State Circuits, vol. 33, No. 5, May 1998, pp. 770-778.

Ishibashi, A. et al., "High-Speed Clock Distribution Architecture Employing PLL for 0.6 μm CMOS SOG", IEEE Custom Integrated Circuits Conference, 1992, pp. 27.6.1-27.6.4.

Kim, B. et al., "A 30MHz High-Speed Analog/Digital PLL in 2 μm CMOS", ISSCC, Feb. 1990.

Kikuchi, S. et al., "A Gate-Array-Based 666MHz VLSI Test System", IEEE International Test Conference, Paper 21.1, 1995, pp. 451-458.

Ko, U. et al., "A 30-ps Jitter, 3.6-μs Locking, 3.3-Volt Digital PLL for CMOS Gate Arrays", IEEE Custom Integrated Circuits Conference, 1993, pp. 23.3.1-23.3.4.

Lee, T. et al., "A 2.5V Delay-Locked Loop for an 18Mb 500MB/s DRAM", IEEE International Solid-State Curcuits Conference Digest of Technical Papers, Paper No. FA 18.6, 1994, pp. 300-301.

Lesmeister, G., "A Densely Integrated High Performance CMOS Tester", International Test Conference, Paper 16.2, 1991, pp. 426-429.

Ljuslin, C. et al., "An Integrated 16-channel CMOS Time to Digital Converter", IEEE Nuclear Science Symposium & Medical Imaging Conference Record, vol. 1, 1993, pp. 625-629.

Maneatis, J., "Low-Jitter Process-Independent DLL and PLL Based on Self-Biased Techniques", IEEE Journal of Solid-State Circuits, vol. 31, No. 11, Nov. 1996, pp. 1723-1732.

Nakamura, M. et al., "A 156 Mbps CMOS Clock Recovery Circuit for Burst-mode Transmission", Symposium on VLSI Circuits Digest of Technical Papers, 1996, pp. 122-123.

Nielson, E., "Inverting latches make simple VCO", EDN Jun. 19, 1997.

Novof, I. et al., "Fully Integrated CMOS Phase-Locked Loop with 15 to 240 MHz Locking Range and ±50 ps Jitter", IEEE Journal of Solid-State Circuits, vol. 30, No. 11, Nov. 1995, pp. 1259-1266.

Saeki, T. et al., "A 2.5-ns Clock Access, 250-MHz, 256-Mb SDRAM with Synchronous Mirror Delay", IEEE Journal of Solid-State Circuits, vol. 31, No. 11, Nov. 1996, pp. 1656-1665.

Santos, D. et al., "A CMOS Delay Locked Loop And Sub-Nanosecond Time-to-Digital Converter Chip", IEEE Nuclear Science Symposium and Medical Imaging Conference Record, vol. 1, Oct. 1995, pp. 289-291.

Shirotori, T. et al., "PLL-based, Impedance Controlled Output Buffer", 1991 Symposium on VLSI Circuits Digest of Technical Papers, pp. 49-50.

Sidiropoulos, S. et al., "A 700-Mb/s/pin CMOS Signaling Interface Using Current Integrating Receivers", IEEE Journal of Solid-State Circuits, vol. 32, No. 5, May 1997, pp. 681-690.

Sidiropoulos, S. et al., "A CMOS 500 Mbps/pin synchronous point to point link interface", IEEE Symposium on VLSI Circuits Digest of Technical Papers, 1994, pp. 43.44.

Sidiropoulos, S. et al., "A Semi-Digital DLL with Unlimited Phase Shift Capability and 0.08-400MHz Operating Range," IEEE International Solid State Circuits Conference, Feb. 8, 1997, pp. 332-333.

Soyuer, M. et al., "A Fully Monolithic 1.25GHz CMOS Frequency Synthesizer", IEEE Symposium on VLSI Circuits Digest of Technical Papers, 1994, pp. 127-128.

Taguchi, M. et al., "A 40-ns 64-Mb DRAM with 64-b Parallel Data Bus Architecture", IEEE Journal of Solid-State Circuits, vol. 26, No. 11, Nov. 1991, pp. 1493-1497.

Tanoi, S. et al., "A 250-622 MHz Deskew and Jitter-Suppressed Clock Buffer Using a Frequency- and Delay-Locked Two-Loop Architecture", 1995 Symposium on VLSI Circuits Digest of Technical Papers, vol. 11, No. 2, pp. 85-86.

Tanoi, S. et al., "A 250-622 MHz Deskew and Jitter-Suppressed Clock Buffer Using Two-Loop Architecture", IEEE IEICE Trans. Electron., vol. E-79-C. No. 7, Jul. 1996, pp. 898-904.

von Kaenel, V. et al., "A 320 MHz, 1.5 mW @ 1.35 V CMOS PLL for Microprocessor Clock Generation", IEEE Journal of Solid-State Circuits, vol. 31, No. 11, Nov. 1996, pp. 1715-1722.

Watson, R. et al., "Clock Buffer Chip with Absolute Delay Regulation Over Process and Environmental Variations", IEEE Custom Integrated Circuits Conference, 1992, pp. 25.2.1-25.2.5.

Yoshimura, T. et al., "A 622-Mb/s Bit/Frame Synchronizer for High-Speed Backplane Data Communication", IEEE Journal of Solid-State Circuits, vol. 31, No. 7, Jul. 1996, pp. 1063-1066.

* cited by examiner

DYNAMIC SYNCHRONIZATION OF DATA CAPTURE ON AN OPTICAL OR OTHER HIGH SPEED COMMUNICATIONS LINK

TECHNICAL FIELD

The present invention relates generally to data communications systems, and more specifically to synchronizing a data communications system to ensure data signals transferred by the system are successfully transferred.

BACKGROUND OF THE INVENTION

Figure 1:
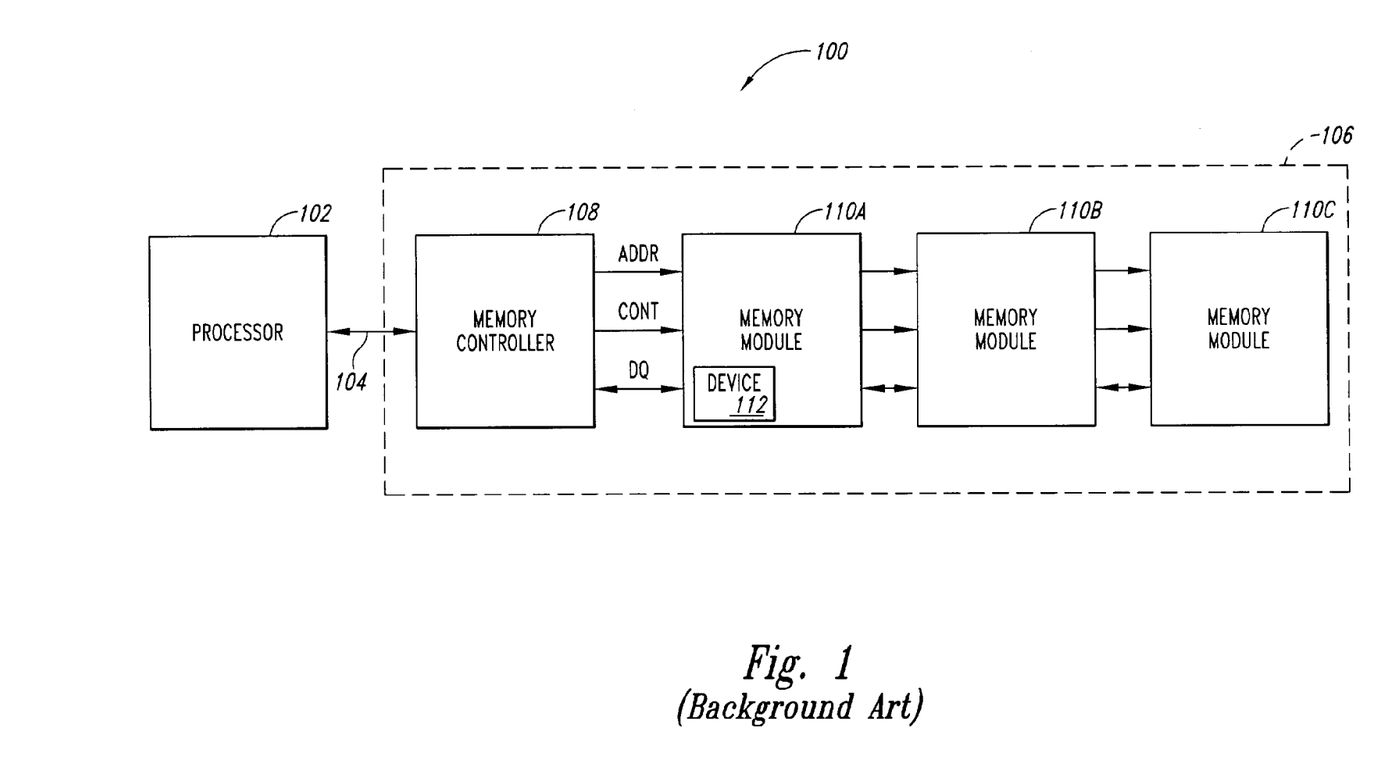
FIG. 1 is a functional block diagram of a portion of a conventional computer system including a system memory having a memory controller coupled through address, control, and data busses to a number of memory modules.

A conventional computer system 100 includes a processor 102 coupled through a system bus 104 to a system memory 106 as illustrated in FIG. 1. The system memory 106 includes a memory controller 108 coupled to the system bus 104 and coupled to three memory modules 110A–C though a common data bus DQ, address bus ADDR, and control bus CONT. Each memory module 110A–C includes a plurality of individual memory devices 112, one of which is shown on the memory module 110A. Each of the memory devices 112 is typically a dynamic random access memory (DRAM) since DRAMs form the largest portion of system memory 106 because they provide large storage capacity at relatively inexpensive prices. In response to a request from the processor 102, the memory controller 108 initiates a memory operation by providing a memory command in the form of control signals and a memory address (generally in the form of a row address and a column address) on the control bus CONT and address bus ADDR, respectively, to all of the memory modules 110A–C. If the memory operation is a write operation, the memory controller 108 will also apply write data to the memory modules 110A–C through the data bus DQ. To prevent all of the memory modules 110A–C from responding to the memory command, the memory controller 108 also generally applies a unique chip select or similar select signal over the control bus CONT to each of the memory modules 110A–C so that only the memory module receiving an active chip select signal responds to the memory command. Each memory module 110A–C may receive more than one chip select signal, with each group of memory devices 112 receiving the same chip select signal being designated a "rank" of memory.

Conventional processors 102 generally operate at a relatively high speed compared to the memory modules 110A–C. Because access to system memory 106 is a frequent operation of the processor 102, the slower operating speed of the memory 110A–C greatly slows the overall operation of the computer system 100, as will be appreciated by those skilled in the art. As a result, much effort has been put into increasing the data transfer rate or bandwidth of the data bus DQ to enable system memory 106 to transfer data more quickly. To increase the bandwidth of the data bus DQ, the width of the data bus has been increased, and new types of DRAM technology having much higher transfer speeds, such as RAMBUS DRAMs ("RDRAMs") and synchronous link DRAMs ("SLDRAMs"), have also been developed. As the operating speed of the data bus DQ increases, however, noise, signal skew, a smaller data eye—which defines the duration for which the data signals are valid—and other factors make it more difficult to reliably transfer data over the data bus.

One approach that has been utilized in transferring data more reliably at high data transfer rates is an adaptive process of adjusting the delay between data signals and a clock signal transmitted along with the data signals. A receiving device captures the data signals in response to the clock signal. The process involves applying the clock signal and a pseudorandom bit pattern having known values on the data bus DQ. The timing relationship or delay between the data signals forming the pseudorandom bit pattern and the clock signal is thereafter adjusted through a series of values, and the bit pattern captured at each value of the delay. Because the pseudorandom bit pattern has known values, the captured data can be compared to the expected values to determine whether the bit pattern was successfully captured at each value of the delay between the bit pattern and the clock signal. The values for the delay between the bit pattern and the clock signal where the bit pattern was unsuccessfully captured are designated failing values, and the values where the bit pattern was successfully captured are designated passing values. The range of the passing values define the data eye of the applied bit pattern, and a final value of the delay between the bit pattern and the clock signal may be selected in the middle of the data eye to optimize the delay for successful capture of the bit pattern. This approach is described in more detail in U.S. Pat. No. 6,338,127 to Manning entitled METHOD AND APPARATUS FOR RESYNCHRONIZING A PLURALITY OF CLOCK SIGNALS USED TO LATCH RESPECTIVE DIGITAL SIGNALS, AND MEMORY DEVICE USING SAME, and in U.S. Pat. No. 6,374,360 to Keeth et al. entitled METHOD AND APPARATUS FOR BIT-TO-BIT TIMING CORRECTION OF A HIGH SPEED MEMORY BUS, both of which are incorporated herein by reference.

In addition to systems communicating via electrical signals, such as the RDRAM and SLDRAM technologies mentioned above, optically-based memory systems including an optical communications link between the memory controller 108 and memory modules 110A-C have also been developed to increase the bandwidth of system memory 106. In such optically-based systems, however, problems of transmitting and receiving optical signals between the memory controller 108 and the memory modules 110A-C result in unacceptably high bit error rates (BER) and continue to hamper the commercialization of such systems, particularly in system memories 106 having parallel, closely-spaced memory modules of the type found in many existing personal computer systems. For example, in an optically-based system the optical transmitter and receiver must be designed to have sufficient dynamic range to accommodate all possible variations in system memory parameters such as the total number of memory modules. Dynamic range defines the required operating range of a parameter of the receiver or transmitter, such as required power of a received optical signal for a receiver, as will be understood by those skilled in the art. Sufficient dynamic range is required to ensure optical signals are reliably transmitted and received, and transmitters and receivers having larger dynamic range are more costly, increasing the overall cost of optically-based memory systems.

There is a need for a system memory that reliably transfers data at a high bandwidth but has a relatively low cost for use in computer systems and other cost-sensitive applications.

SUMMARY OF THE INVENTION

According to one aspect of the present invention, a method dynamically adjusts link control parameters of a communications network. The communications network includes a transmitter coupled through a first data link to a receiver, with the transmitter and receiver each have at least one associated link control parameter that affects the operation of that component. Data signals are transmitted over the first data link and the transmitted data signals are captured. The values of the captured data signals are compared to expected values for those signals, and the values of the link control parameters are adjusted to successfully capture the transmitted digital signals.

DETAILED DESCRIPTION OF THE INVENTION

Figure 2:
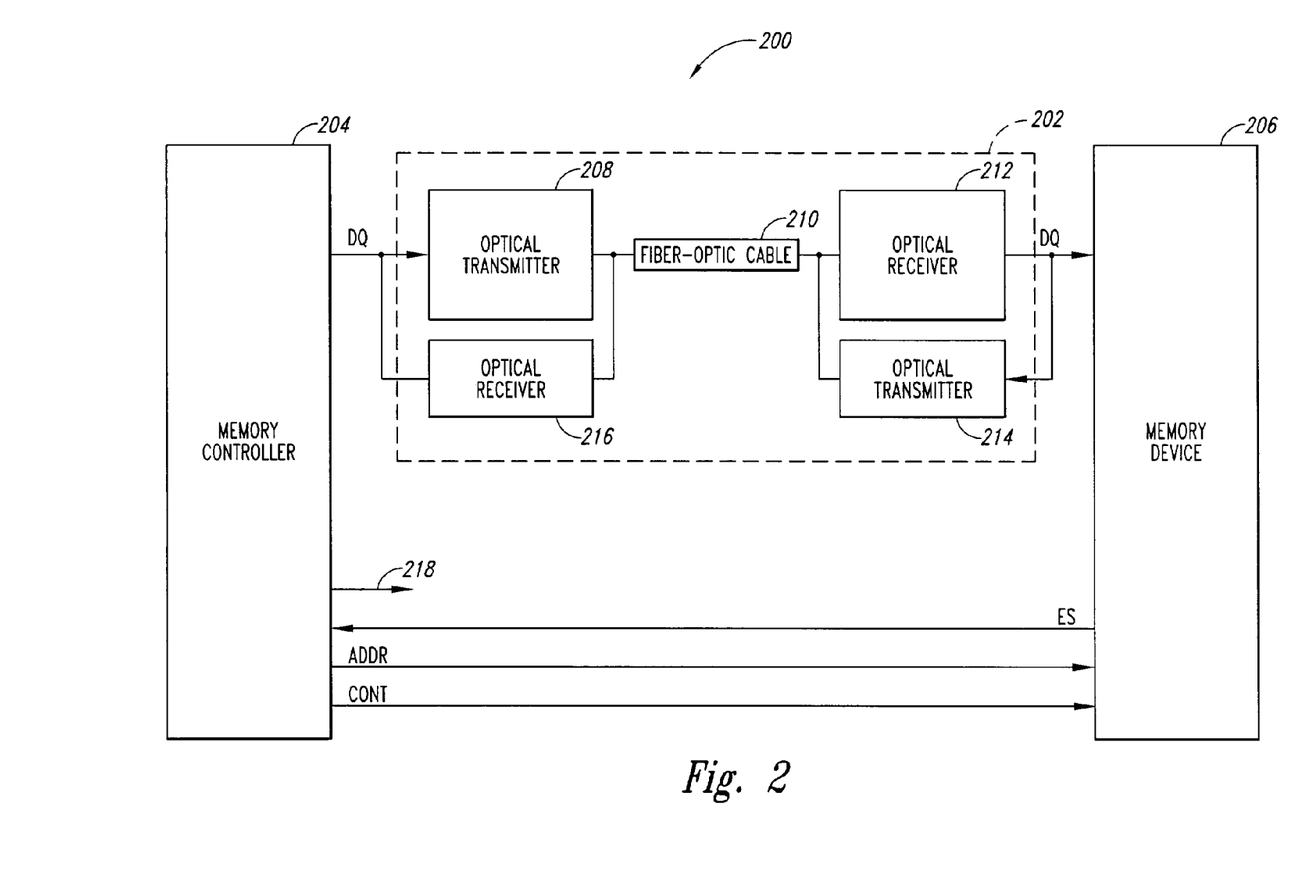
FIG. 2 is a functional block diagram of a portion of a system memory that executes an adaptive synchronization process of an optical communications link according to one embodiment of the present invention.

FIG. 2 is a functional block diagram of a portion of a system memory 200 including an optical communications link 202 for transferring data between a memory controller 204 and a memory device 206 according to one embodiment of the present invention. The optical communications link 202 includes an optical transmitter 208 that transfers write data from the memory controller 204 through a fiber-optic cable 210 or other suitable optical transmission medium to an optical receiver 212 which, in turn, provides the write data to the memory device 206, as will be described in more detail below. The optical communications link 202 further includes an optical transmitter 214 for transferring read data from the memory device 206 through the fiber-optic cable 210 to an optical receiver 216, which then provides the read data to the memory controller 204. Unlike prior optically-based memory systems, the system memory 200 executes an adaptive synchronization process of adjusting various operating parameters of the optical transmitters 208, 214 and optical receivers 212, 216 to reduce the bit error rate, lower the power consumption, and provide dynamic compensation for temperature and aging affects in the optical communications link, as will be described in more detail below. The system memory 200 executes this adaptive process to optimize the performance of the optical communications link 202 which, in turn, improves overall performance of the system memory by providing reliable high bandwidth data transfer between the memory controller 204 and memory device 206. During the adaptive process executed by the system memory 200, the memory device 206 provides to the memory controller 204 an error signal ES indicating whether particular data signals were successfully transferred over the optical communications link, as will be discussed in more detail below.

In the system memory 200, the optical communications link 202 corresponds to a data bus DQ for transferring data between the memory controller 204 and memory device 206. An address bus ADDR and control bus CONT are electrical busses through which the memory controller 204 applies address and control signals, respectively, to the memory device 206. With other embodiments of the system memory 200, the communications link 202 also includes the address and control busses ADDR, CONT for communicating address and control signals from the memory controller 204 to the memory device 206. Although only the single memory device 206 is depicted in FIG. 2, this is done merely for ease of illustration and description of the system memory 200, and the system memory would normally include one or more memory modules (see FIG. 1) each containing a plurality of memory devices. The memory controller 204 generates a plurality of control signals 218 that are applied to the transmitters 208, 214 and receivers 212, 216 to adjust the link control parameters of these components. In the following description of several embodiments of the present invention, certain details are set forth to provide a sufficient understanding of the invention, but one skilled in the art will appreciate that the invention may be practiced without these particular details. In other instances, the operation of well known components has not been shown or described in detail to avoid unnecessarily obscuring the present invention.

Before describing the overall adaptive synchronization process executed by the system memory 200, the operation of the optical transmitters 208, 214 and optical receivers 212, 216 will be described in more detail. Operation of the optical transmitters 208 and 214 is the same, as is the operation of the optical receivers 212 and 216, and thus, for the sake of brevity, only the operation of the transmitter 208 and receiver 212 will be described in more detail. The optical transmitter 208 receives a bit stream of electrical data signals from the memory controller 204, modulates an optical carrier signal with the received bit stream, and couples the modulated optical carrier into the fiber-optic cable 210. Typically, the optical transmitter 208 includes a light emitting diode (LED) or laser diode for generating the optical carrier signal. The optical transmitter 208 includes several operational parameters whose values are typically defined during design of the system containing the optical transmitter.

One such operational parameter of the optical transmitter 208 is a gain of the transmitter and determines the power of a light corresponding to the optical carrier signal that is coupled into the fiber-optic cable 210. The transmitter 208 must provide an optical carrier signal having sufficient power to propagate through the fiber-optic cable 210 and be received by the optical receiver 212. The gain of the optical transmitter 208 ensures the optical carrier signal a sufficient power to compensate for various losses in the communications link 202, such as attenuation in the fiber-optic optic cable 210 and losses resulting from inefficient coupling of the optical transmitter to the fiber-optic cable. Another operational parameter of the optical transmitter 208 is a pulse-shaping parameter that ensures the optical transmitter 208 generates an optical carrier signal having the required shape to allow the carrier signal to be reliably detected and demodulated by the optical receiver 212. When an LED is used as the light generation source in the optical transmitter 208, the pulse-shaping parameter compensates for differing turn ON and OFF times of the LED.

The optical receiver 212 senses or detects the received modulated optical carrier signal propagating through the fiber-optic optic cable 210, converts the modulated optical carrier signal into corresponding electrical signals, and demodulates the signal to obtain the originally transmitted data signals. Typically, the optical receiver 212 includes a photo diode for detecting the received modulated optical carrier signal. One operational parameter associated with the optical receiver 212 is an input threshold level or sensitivity that defines a minimum optical power the receiver can reliably detect at a given data rate in order to achieve a particular bit error rate. The optical receiver 212 may also include a link monitor, which is circuitry indicating when the received modulated optical carrier signal from the fiber-optic cable 210 is less than the required minimum optical power. Suitable circuitry for forming all components 202–216 in the system memory 200 will be understood by those skilled in the art, and thus, for the sake of brevity, such circuitry will not be described or depicted in more detail.

Figure 3:
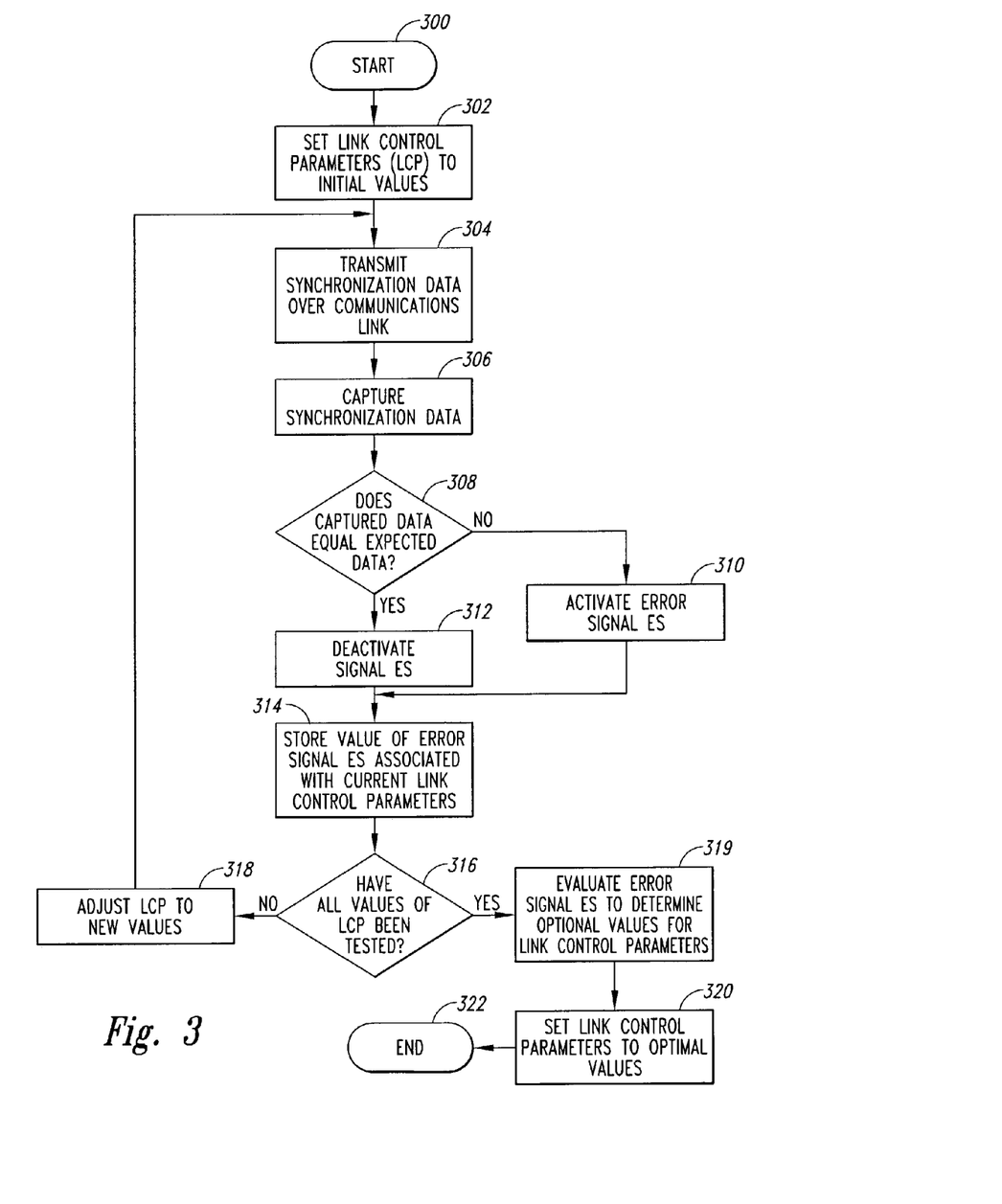
FIG. 3 is a flow chart illustrating the synchronization process executed by the system memory of FIG. 2 according to one embodiment of the present invention.

The overall process executed by the system memory 200 in adaptively adjusting the operational parameters of the optical transmitters 208, 214 and optical receivers 212, 216 will now be described in more detail with reference to the flowchart of FIG. 3. In the following description, the operational parameters of the transmitters 208, 214 and receivers 212, 216, may alternately be referred to as link control parameters since the values of these parameters affect or control the overall operation of the optical communications link 202. The process executed by the system memory 200 during write operations in synchronizing the transfer of write data from the memory controller 204 through the optical transmitter 208, cable 210, and optical receiver 212 to the memory device 206 will now be described in more detail with reference to FIG. 3. The process begins in step 300 and proceeds immediately to step 302 in which the memory controller 204 (FIG. 2) initializes the values of the various link control parameters associated with the optical transmitter 208 and optical receiver 212. Once the link control parameters have been initialized, the process goes to step 304 and the memory controller 204 applies synchronization data to the optical transmitter 208 in the form of a pseudorandom bit pattern. Such synchronization data may, for example, be a pseudorandom bit pattern including a known repeating sequence of pseudorandom bits. One suitable pseudorandom bit pattern is the pattern utilized in synchronizing SLDRAM memory devices, as will be understood by those skilled in the art. In response to the applied synchronization data, the optical transmitter 208 modulates the optical carrier signal which, in turn, is propagated through the fiber-optic cable 210 to the optical receiver 212.

From step 304, the process goes to step 306 and the memory device 206 captures the synchronization data transmitted over the optical communications link 202. More specifically, the optical receiver 212 detects, converts, and demodulates the received modulated optical carrier signal to obtain electrical received data signals that ideally should correspond to the originally transmitted synchronization data. The process proceeds to step 308 in which the electrical received data signals from the optical receiver 212 are transferred to the memory device 206 which, in turn, compares the values of the received data signals to expected values for those signals. The synchronization data has known values, and thus the memory device 206 is able to generate the expected values for the received data signals. For example, when the synchronization data is a pseudorandom bit pattern having a known repeating sequence of bits, the memory device 206 can determine expected values for the received data signals.

When the determination in step 308 is negative, meaning the received data signals do not equal the expected values for those signals, the process goes to step 310 and the memory device 206 activates the error signal ES. If the determination in step 308 is positive, which means the received data signals are equal to the expected values for those signals, the process goes to step 312 and the memory device 206 deactivates the error signal ES. From either step 310 or step 312, the process of proceeds to step 314 and the current value of the error signal ES associated with the current values of a link control parameters is stored. Note, the values of the error signal ES can be stored in the memory device 206 and later transferred to the memory controller 204 to these values may be transferred as they are generated. In the embodiment of FIG. 2, the error signal ES is an electrical signal and is applied to the memory controller 204 through a conventional electrical bus and not through the optical communications link 202.

After the value of error signal ES associated with the current link control parameters has been stored in step 314, the process goes to step 316 and the memory controller 204 and determines whether all values of the link control parameters have been tested. This determination indicates whether each link control parameter has been assigned every possible value within a possible range of values for the parameter. When the determination in step 316 is negative, the process goes to step 318 and the memory controller 204 adjusts the values of one or more link control parameters. The process then goes back and repeats steps 304–316 for the new values of the link control parameters established in step 318. In this way, the memory controller 204 repeatedly adjusts the values of link control parameters and thereafter transmits synchronization data to the memory device 206 through the optical communications link 202 which now operates according to the new values for the link control parameters. Each time the values of link control parameters are adjusted, the memory device 206 determines whether the received electrical data signals have their expected values and stores the error signal ES having the appropriate value that is associated with the current link control parameters. An array of error signals ES is thus generated, with the value of each error signal in the array being associated with particular values for the link control parameters.

The process continues executing steps 304–316 until the determination in step 316 is positive, meaning that all link control parameters have assumed all desired values. Thus, when the optical communications link 202 has been tested for all desired values of the link control parameters, the determination in step 316 is positive and the process proceeds to step 319. In step 319, if the memory controller 204 does not already contain the array of error signals ES generated during steps 304–316, the error signals are transferred to the memory controller 204. At this point, the memory controller 204 evaluates the array of error signals ES to determine optimal values for the link control parameters. The process then proceeds to step 320 and the memory controller 204 sets each of the link control parameters for the optical transmitter 208 and optical receiver 212 to the determined optimal value. From step 320, the synchronization process goes to step 322 and terminates, with the link control parameters of the optical transmitter 208 and optical receiver 212 having been set to values to be utilized during normal operation of the system memory 200.

Once the link control parameters of the optical transmitter 208 and optical receiver 212 have been set, the system memory 200 executes substantially the same process just described to adjust the link control parameters of the optical transmitter 214 and optical receiver 216 to optimal values and thereby synchronize the optical communication link 202 for read data transfer operations. Because the process of setting the link control parameters of the optical transmitter 214 and optical receiver 216 is substantially the same as just described and will be understood by those skilled in the art, this process will not, for the sake of brevity, be described in more detail.

The times at which the system memory 200 (FIG. 2) executes the synchronization process may be varied, and may be done, for example, upon initial power up of the system memory, periodically, or may be done in response to some other factor (e.g., voltage drifting outside a particular range). Moreover, the specific synchronization process, including which link control parameters are adjusted and the order in which such parameters are adjusted, may vary, as will be appreciated by those skilled in the art. In one embodiment, the system memory 200 adjusts the gain and pulse-shaping parameters of the optical transmitters 208, 214 and the sensitivity of the optical receivers 212, 216 are adjusted. In this embodiment, the synchronization process may adjust each link control parameter over its entire permissible range and store the associated error signals ES for that parameter. Each link control parameter is then set to a value in the middle of a "passing" range, which corresponds to a group of inactive ES signals for consecutive increments of the associated parameter. An iterative process could then be utilized to optimize all the link control parameters starting from these initial values. Alternatively, a prioritization algorithm can be executed by the system memory 200 in adjusting the link control parameters. For example, all link control parameters could be set to initial nominal values, the sensitivity of the optical receivers 212, 216 adjusted first to achieve low power consumption by the receivers. The gain of the optical transmitters 208, 214 could be adjusted next, with the pulse-shaping parameter adjusted last to effectively obtain vernier improvements of performance given the first two parameters. Another approach would be to try every possible combination of values for the gain, pulse-shaping, and sensitivity parameters, and establish the largest range of passing values for each parameter for all possible values of the other two parameters. This approach may be slow, however, given the potentially large number of combinations to be tried.

Referring back to FIG. 2, the adaptive synchronization process executed by the system memory 200 reduces the bit error rate of the optical communication link 202 by dynamically adjusting the link control parameters of the optical transmitters 208, 214 and optical receivers 212, 216 since a final value for each parameter is dynamically determined and thereafter utilized during normal operation of the system memory. The process also results in lower power consumption by the system memory 200 since the adjustment of the link control parameters optimizes the operation of the link 202 instead of assigning link control parameters of components 208–216 within the link predetermined values that must ensure proper operation for all configurations of the system memory 200. For example, by adaptively adjusting the gain of the optical transmitters 208, 214, the power consumption of the transmitters is decreased since the transmitter need not provide a fixed amount of optical energy to ensure proper operation, unlike in conventional optical communications links where the transmitter supplies a minimum amount of optical power, which may be more power than is needed in some configurations. The dynamic synchronization process of the system memory 200 also adjusts for the affects of temperature, voltage, and aging affects of components 208–216 in the optical communications link 202, which may vary as a function of time.

The process for synchronizing the optical communications link 202 may also be combined with a synchronization process for adjusting the delay between the electronic data signals and a clock signals transmitted along with those electronic data signals. Such a synchronization process for electrical data signals and a clock signal was previously discussed with reference to the conventional system memory 106 of FIG. 1. In the system memory 200 of FIG. 2, the transfer of the electrical data signals between the memory controller 204 and the transmitter 208 and receiver 216 would typically be done responsive to an accompanying clock signal, as would the transfer of electrical data signals between the receiver 212 and transmitter 214 and the memory device 206. Thus, the synchronization process for the link control parameters may be combined with this other synchronization process to further improve reliability of the system memory 200. For example, the link control parameters of the transmitters 208, 214, and receivers 212, 216 may first be set according the above process. The values of the link control parameters may affect the delays introduced by the transmitters 208, 214, and receivers 212, 216. Thus, after the link control parameters are set, the transfer of data signals and clock signal can be synchronized for the transfer of data between the memory controller 204 and the transmitter 208, receiver 216 and for the transfer of electrical data signals between the receiver 212, transmitter 214 and the memory device 206.

Figure 4:
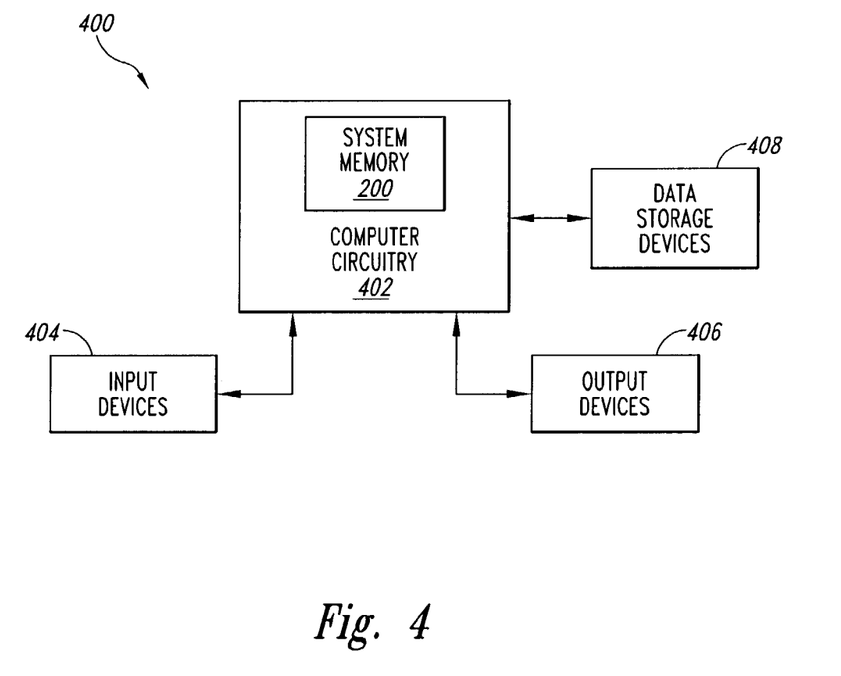
FIG. 4 is a functional block diagram of a computer system including the system memory of FIG. 2.

FIG. 4 is a functional block diagram of a computer system 400 including the system memory 200 of FIG. 2. The computer system 400 includes computer circuitry 402 for performing various computing functions, such as executing specific software to perform specific calculations or tasks. In addition, the computer system 400 includes one or more input devices 404, such as a keyboard or a mouse, coupled to the computer circuitry 402 to allow an operator to interface with the computer system. Typically, the computer system 400 also includes one or more output devices 406 coupled to the computer circuitry 402, such output devices typically being a printer or a video terminal. One or more data storage devices 408 are also typically coupled to the computer circuitry 402 to store data or retrieve data from external storage media (not shown). Examples of typical storage devices 408 include hard and floppy disks, tape cassettes, and compact disk read only memories (CD-ROMs). The computer circuitry 402 is typically coupled to the system memory 200 through a conventional electronic control, data, and address busses to provide for writing data to and reading data from the system memory.

As previously mentioned, the optical communications link 202 could include other suitable transmission media in place of the fiber-optic cable 210 such as free space. Moreover, although the system memory 200 is described and depicted as including the optical communications link 202, other high speed communications links such as a radio frequency or microwave link could be utilized in place of the optical communications link. The concepts described above are equally applicable for adaptively adjusting the operational parameters of such a radio frequency, microwave, or other high speed communications link, as will be appreciated by those skilled in the art. Even though various embodiments and advantages of the present invention have been set forth in the foregoing description, the above disclosure is illustrative only, and one skilled in the art will understand various equivalents and modifications of the described components and concepts that may be made in detail and yet remain within the broad principles of the invention. For example, some of the components described above may be implemented using either digital or analog circuitry, or a combination of both, and also, where appropriate, may be realized through software executing on suitable processing circuitry. Therefore, the present invention is to be limited only by the appended claims.

The invention claimed is:

1. A method of dynamically adjusting operating parameters of a communications link including a transmitter coupled through a data link to a receiver, each of the transmitter and receiver having at least one associated link control parameter that affects its operation, the method comprising:
    setting each link control parameter to an initial value;
    transmitting data signals over the data link;
    receiving the data signals transmitted over the data link;
    determining whether the received data signals were successfully communicated over the data link;
    adjusting the values of the link control parameters;
    repeating the operations of transmitting data signals over the data link to adjusting the values of the link control parameters;
    determining final values of the link control parameters for the transmitter and receiver from the operations of determining whether the received data signals were successfully communicated over the data link associated with each of the adjusted values of the link control parameters; and
    setting each of the link control parameters to the determined final value.

2. The method of claim 1 wherein the communications link comprises an optical communications link.

3. The method of claim 2 wherein the adjusted link control parameters include a gain and a pulse shaping parameter associated with the transmitter, and an input threshold parameter associated with the receiver.

4. The method of claim 2 wherein the optical communications link includes a fiber-optic cable.

5. The method of claim 1 wherein the data signals transmitted over the link comprise a pseudo random bit pattern having a known repeating pattern.

6. The method of claim 1 wherein determining whether the received data signals were successfully communicated over the data link comprises comparing the received data signals to expected values for the received data signals.

7. The method of claim 1 wherein adjusting the value of the link control parameters comprises adjusting the value of each parameter over an entire range of values for that parameter.

8. The method of claim 7 wherein determining whether the received data signals were successfully communicated over the data link comprises generating an error signal indicating whether the data signals were successfully captured, each error signal being associated with particular values of the link control parameters.

9. The method of claim 8 wherein determining final values of the link control parameters for the transmitter and receiver comprises selecting a final value for each link control parameter that is in the middle of a passing range of the error signals for this parameter.

10. The method of claim 1 wherein the each link control parameter is assigned a priority, and wherein the order in which final values for the link control parameters is determined by the priorities assigned to the parameters, with link control parameters having higher assigned priorities being determined before link control parameters having lower assigned priorities.

11. The method of claim 10 wherein the link control parameters comprise a gain and a pulse-shaping parameter associated with the transmitter and an input threshold parameter associated with the receiver, and wherein the input threshold parameter is assigned a first priority, the gain is assigned a second priority, and the pulse-shaping parameter a third priority, the first priority being greater than the second priority and the second priority being greater than the third priority.

12. The method of claim 1 further comprising after each of the link control parameters is set to the determined final value, repeating the overall method after a time T to determine new values for the link control parameters.

13. The method of claim 1 further comprising after each of the link control parameters is set to the determined final value, repeating the overall method in response to a system parameter.

14. The method of claim 13 wherein the system parameter comprises a voltage and wherein the method is repeated responsive to the voltage having a value outside a defined range.

15. A system memory, comprising:
    a data link;
    a transmitter coupled to the data link and operable to receive data and communicate the data through the data link;
    a receiver coupled to the data link to receive data from the data link and operable to output the received data;
    a memory coupled to the receiver in the communications link, the memory operable during a synchronization mode to receive data from the receiver and compare the received data to expected values for the data, the memory generating an error signal responsive to the comparison; and
    a memory controller coupled to the transmitter and receiver and coupled to the memory, the memory controller operable during the synchronization mode to apply a bit pattern to the transmitter and to apply control signals to adjust the values of the link control parameters of the transmitter and receiver, and the memory controller adjusting the link control parameters to final values using the values of the generated error signals from the memory.

16. The system memory of claim 15 wherein the data link comprises a fiber-optic cable and wherein the transmitter and receiver comprise an optical transmitter and optical receiver, respectively.

17. The system memory of claim 16 wherein the memory controller is configured to adjust a gain and a pulse shaping link control parameter associated with the transmitter, and an input threshold link control parameter associated with the receiver.

18. The system memory of claim 15 wherein the memory comprises a dynamic random access memory.

19. The system memory of claim 18, wherein the memory comprises a memory module including a plurality of dynamic random access memories.

20. The system memory of claim 15 wherein the data communicated over the communications link comprise data, address, and control signals.

21. The system memory of claim 15 wherein the memory controller is electrically coupled to the memory through address and control busses.

22. The system memory of claim 21 wherein the memory controller is electrically coupled to the memory to receive the error signal.

23. The system memory of claim 15 wherein the data link comprises a radio frequency communication link and wherein the transmitter and receiver comprise a radio frequency transmitter and radio frequency receiver, respectively.

24. The system memory of claim 15 wherein the bit pattern applied to the transmitter comprises a pseudo random bit pattern having a known repeating sequence.

25. The system memory of claim 15 wherein the memory controller adjusts the value of the value of each link control parameter over an entire range of values for that parameter.

26. The system memory of claim 15 wherein the memory controller adjusts the final value for each link control parameter to a value that is in the middle of a passing range of the associated error signals for this parameter.

27. The system memory of claim 15 wherein each link control parameter is assigned a priority, and wherein the order in the memory controller adjusts the final values for the link control parameters is determined by the priorities assigned to the parameters, with the link control parameters having higher assigned priorities being determined before link control parameters having lower assigned priorities.

28. The system memory of claim 27 wherein the link control parameters adjusted by the memory controller comprise a gain and a pulse-shaping parameter associated with the transmitter and an input threshold parameter associated with the receiver, and wherein the input threshold parameter is assigned a first priority, the gain is assigned a second priority, and the pulse-shaping parameter a third priority, the first priority being greater than the second priority and the second priority being greater than the third priority.

29. The system memory of claim 15 wherein the memory controller and memory periodically operate in the synchronization mode to adjust the final values of the link control parameters.

30. The system memory of claim 15 wherein the memory controller and memory periodically operate in the synchronization mode responsive to a system parameter to adjust the final values of the link control parameters.

31. The system memory of claim 30 wherein the system parameter comprises a voltage and wherein the memory controller and memory enter the synchronization mode responsive to the voltage having a value outside a defined range.

32. The system memory of claim 15 further comprising a second transmitter coupled to the memory and coupled to the data link, and a second receiver coupled to the memory controller and the data link.

33. A computer system, comprising:
a processor having a processor bus;
an input device coupled to the processor through the processor bus adapted to allow data to be entered into the computer system;
an output device coupled to the processor through the processor bus adapted to allow data to be output from the computer system; and
a system memory coupled to the processor bus, the system memory including,
a data link;
a transmitter coupled to the data link and operable to receive data from the processor over the processor bus and communicate the data through the data link;
a receiver coupled to the data link to receive data from the data link and operable to output the received data;
a memory coupled to the receiver, the memory operable during a synchronization mode to receive data from the receiver and compare the received data to expected values for the data, the memory generating an error signal responsive to the comparison; and
a memory controller coupled to the transmitter, receiver, and the memory, the memory controller operable during the synchronization mode to apply a bit pattern to the transmitter over the processor bus and to develop control signals to adjust the values of the link control parameters of the transmitter and receiver, and the memory controller adjusting the link control parameters to final values using the values of the generated error signals from the memory.

34. The computer system of claim 33 wherein the data link comprises a fiber-optic cable and wherein the transmitter and receiver comprise an optical transmitter and optical receiver, respectively.

35. The computer system of claim 34 wherein the memory controller adjusts a gain and a pulse shaping link control parameter associated with the transmitter, and an input threshold link control parameter associated with the receiver.

36. The computer system of claim 33 wherein the memory comprises a dynamic random access memory.

37. The computer system of claim 36 wherein the memory comprises a memory module including a plurality of dynamic random access memories.

38. The computer system of claim 33 further comprising a second transmitter coupled to the memory and coupled to the data link, and a second receiver coupled to the memory controller and the data link.

39. The computer system of claim 38 wherein the error signal is coupled to the memory controller through the second transmitter, data link, and second receiver.

40. The computer system of claim 33 wherein the memory controller is electrically coupled to the memory through address and control busses.

41. The computer system of claim 40 wherein the memory controller is electrically coupled to the memory to receive the error signal.

* * * * *